United States Patent
Nagai et al.

(10) Patent No.: US 9,512,310 B2
(45) Date of Patent: Dec. 6, 2016

(54) POLYVINYL ACETAL-BASED RESIN COMPOSITION

(71) Applicant: SEKISUI CHEMICAL CO., LTD., Osaka (JP)

(72) Inventors: Yasuharu Nagai, Osaka (JP); Kaoru Mikayama, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 14/431,324

(22) PCT Filed: Sep. 20, 2013

(86) PCT No.: PCT/JP2013/075514
§ 371 (c)(1),
(2) Date: Mar. 26, 2015

(87) PCT Pub. No.: WO2014/050746
PCT Pub. Date: Apr. 3, 2014

(65) Prior Publication Data
US 2015/0240067 A1    Aug. 27, 2015

(30) Foreign Application Priority Data

Sep. 28, 2012 (JP) ................................. 2012-218732

(51) Int. Cl.
C08F 2/44 (2006.01)
C08F 261/12 (2006.01)
C08L 29/14 (2006.01)
C08L 33/04 (2006.01)
C08L 33/14 (2006.01)

(52) U.S. Cl.
CPC ............. *C08L 33/14* (2013.01); *C08F 261/12* (2013.01); *C08L 29/14* (2013.01); *C08L 2205/22* (2013.01)

(58) Field of Classification Search
None
See application file for complete search history.

(56) References Cited

U.S. PATENT DOCUMENTS

| | | | |
|---|---|---|---|
| 5,223,475 A * | 6/1993 | Bloodworth | B41M 5/5254 428/195.1 |
| 2006/0008658 A1 | 1/2006 | Fukatani et al. | |
| 2011/0112247 A1 | 5/2011 | Tokuchi et al. | |
| 2013/0267647 A1* | 10/2013 | Tsujimoto | C08F 116/06 524/543 |

FOREIGN PATENT DOCUMENTS

| | | |
|---|---|---|
| CN | 1839059 | 9/2006 |
| EP | 1 657 092 | 5/2006 |
| JP | 50-119033 | 9/1975 |
| JP | 4-120113 | 4/1992 |
| JP | 2001-261758 | 9/2001 |
| JP | 2001-278915 | 10/2001 |
| JP | 2003-183325 | 7/2003 |
| JP | 2005-15654 | 1/2005 |
| JP | 2009-73970 | 4/2009 |
| JP | 2009-161602 | 7/2009 |
| JP | 2012158723 A * | 8/2012 |
| JP | 2013-28763 | 2/2013 |
| WO | 03/097347 | 11/2003 |
| WO | 2009/130883 | 10/2009 |
| WO | WO-2012043455 A1 * | 4/2012 |

OTHER PUBLICATIONS

International Search Report issued Dec. 24, 2013 in International (PCT) Application No. PCT/JP2013/075514.
Extended European Search Report issued May 18, 2016 in corresponding European Application No. 13842039.3.

* cited by examiner

*Primary Examiner* — Irina S Zemel
*Assistant Examiner* — Jeffrey Lenihan
(74) *Attorney, Agent, or Firm* — Wenderoth, Lind & Ponack, L.L.P.

(57) ABSTRACT

The present invention provides a polyvinyl acetal resin composition exerting excellent mechanical strength over a wide temperature range from low temperatures to high temperatures. The present invention provides a polyvinyl acetal resin composition containing a polyvinyl acetal resin and a resin having a crosslinked structure, the polyvinyl acetal resin composition having a structure in which the resin having a crosslinked structure is dispersed as a dispersed phase in the polyvinyl acetal resin as a continuous phase, the polyvinyl acetal resin composition having a maximum value of a loss tangent derived from the polyvinyl acetal resin at 40° C. or higher and a maximum value of a loss tangent derived from the resin having a crosslinked structure at 10° C. or lower in measurement of a dynamic viscoelasticity spectrum at a frequency of 10 Hz.

8 Claims, No Drawings

POLYVINYL ACETAL-BASED RESIN COMPOSITION

TECHNICAL FIELD

The present invention relates to a polyvinyl acetal resin composition exerting excellent mechanical strength over a wide temperature range from low temperatures to high temperatures.

BACKGROUND ART

Polyvinyl acetal resins are used for many purposes such as interlayer films for laminated glass, wash primers for metal treatment, various coating compositions, adhesives, resin processing agents, and ceramic binders. Recently, the applications of polyvinyl acetal resins have been expanded to electronic materials. In particular, laminated glass including a polyvinyl acetal resin film as an interlayer film is favorably used because, even when the glass is damaged by collision of a flying object such as stones, the film between glass sheets absorbs a shock of the collision to prevent penetration of the flying object.

The mechanical strength of thermoplastic resins such as polyvinyl acetal resins, however, commonly has temperature dependence. At low temperatures, though having great breaking strength, a polyvinyl acetal resin has a small elongation rate and is fragile. At high temperatures, in contrast, though having a greater elongation rate, the polyvinyl acetal resin has poor breaking strength and is too soft. In either case, the mechanical strength of the polyvinyl acetal resin is significantly lowered.

Patent Literature 1 discloses, as a polyvinyl acetal resin having better mechanical strength at low temperatures, a laminate wherein a plurality of polyvinyl butyral resin layers is laminated. The laminate disclosed in Patent Literature 1 includes an inner layer that comprises a relatively hard polyvinyl butyral (PVB) and has a Tg within a range of about 35 to 60° C. and outer layers laminated on both faces of the inner layer, which comprise a relatively soft PVB and have a Tg within a range of about 32 to 35° C.

Patent Literature 2 discloses a method for improving mechanical properties of polyvinyl acetal at low temperatures by mixing with a modified polyvinyl acetate having a carboxyl group in the side chain.

Patent Literature 3 discloses a modified polyvinyl acetal having a high glass transition temperature as a polyvinyl acetal resin having better mechanical strength at high temperatures. Patent Literature 3 discloses a modified polyvinyl acetal obtainable by acetalizing a modified polyvinyl alcohol that is prepared by saponification of a vinyl acetate copolymer resulting from copolymerization of 1-methyl vinyl acetate and vinyl acetate.

Patent Literature 4 discloses a modified polyvinyl acetal resin obtainable by acetalizing a modified polyvinyl alcohol randomly having ethylene as a structural unit of a main chain.

Though being capable of improving the mechanical strength at high or low temperatures, the techniques disclosed in Patent Literature 1 to 4 have difficulties in providing a polyvinyl acetal resin with excellent mechanical strength over a wide temperature range from low temperatures to high temperatures.

CITATION LIST

Patent Literature

Patent Literature 1: WO 03/097347
Patent Literature 2: JP-A 2009-161602
Patent Literature 3: JP-A 2001-278915
Patent Literature 4: JP-A 2003-183325

SUMMARY OF INVENTION

Technical Problem

The present invention aims to provide a polyvinyl acetal resin composition exerting excellent mechanical strength over a wide temperature range from low temperatures to high temperatures.

Solution to Problem

The present invention relates to a polyvinyl acetal resin composition containing a polyvinyl acetal resin and a resin having a crosslinked structure, the polyvinyl acetal resin composition having a structure in which the resin having a crosslinked structure is dispersed as a dispersed phase in the polyvinyl acetal resin as a continuous phase, the polyvinyl acetal resin composition having a maximum value of a loss tangent derived from the polyvinyl acetal resin at 40° C. or higher and a maximum value of a loss tangent derived from the resin having a crosslinked structure at 10° C. or lower in measurement of a dynamic viscoelasticity spectrum at a frequency of 10 Hz.

The present invention is specifically described in the following.

The present inventors found that a polyvinyl acetal resin composition exerts excellent mechanical strength over a wide temperature range from low temperatures to high temperatures when it contains a polyvinyl acetal resin and a resin having a crosslinked structure, has a structure in which the resin having a crosslinked structure is dispersed as a dispersed phase in the polyvinyl acetal resin as a continuous phase, and shows a specific dynamic viscoelasticity spectrum, thereby completing the present invention.

The polyvinyl acetal resin composition of the present invention contains a polyvinyl acetal resin and a resin having a crosslinked structure. The polyvinyl acetal resin composition has a structure in which the resin having a crosslinked structure is dispersed as a dispersed phase in the polyvinyl acetal resin as a continuous phase.

The structure comprising a continuous phase and a dispersed phase in the polyvinyl acetal resin composition may be confirmed by the following procedure: A film comprising the polyvinyl acetal resin composition is cut with a razor blade, microtome, or the like, and the cut face is observed with an optical microscope, transmission electron microscope, scanning electron microscope, phase contrast microscope, polarizing microscope, scanning tunneling microscope, Raman microscope, scanning probe microscope, or the like.

The resin having a crosslinked structure is preferably dispersed in the form of substantial spheres in the polyvinyl acetal resin as a continuous phase. In this case, the average dispersion size (diameter) of the resin having a crosslinked structure as a dispersed phase is not particularly limited, and is preferably 0.1 to 10 µm.

The dispersion size (diameter) may be measured by the following procedure: A film comprising the polyvinyl acetal resin composition is cut with a razor blade, microtome, or the like and a photograph of the cut face is taken with an optical microscope, transmission electron microscope, scanning electron microscope, phase contrast microscope, polarizing microscope, scanning tunneling microscope, Raman microscope, scanning probe microscope, or the like, followed by analysis of the photograph with an image analyzer. The average dispersion size (diameter) can be calculated by averaging the dispersion sizes (diameters) of randomly chosen 100 particles of the dispersed phase.

If the resin having a crosslinked structure has an average dispersion size of more than 10 μm, the mechanical strength (breaking elongation and rupture stress) of the polyvinyl acetal resin composition may be lowered at high temperatures and low temperatures. The polyvinyl acetal resin composition that contains the resin having a crosslinked structure with the average dispersion size of less than 0.1 μm is hardly produced. The average dispersion size of the resin having a crosslinked structure is more preferably 0.1 to 3 μm and sill more preferably 0.1 to 2 μm.

The polyvinyl acetal resin composition of the present invention has a maximum value of a loss tangent derived from the polyvinyl acetal resin at 40° C. or higher and a maximum value of a loss tangent derived from the resin having a crosslinked structure at 10° C. or lower in measurement of a dynamic viscoelasticity spectrum at a frequency of 10 Hz.

The mechanical strength of thermoplastic resins such as polyvinyl acetal resins commonly has temperature dependence. At low temperatures, though having great breaking strength, a thermoplastic resin has a small elongation rate and is fragile. At high temperatures, in contrast, though having a greater elongation rate, the thermoplastic resin has poor breaking strength and is too soft. The temperature dependence of the mechanical strength (elongation rate, breaking strength) of a polyvinyl acetal resin composition under application of a stress is significantly lowered over a wide temperature range from low temperatures to high temperatures in a case where the polyvinyl acetal resin composition has a continuous phase and a dispersed phase and where the dynamic viscoelasticity spectrum is adjusted to the above range so that the difference between the temperature at which the loss tangent derived from the polyvinyl acetal resin reaches the maximum value and the temperature at which the loss tangent derived from the resin having a crosslinked structure reaches the maximum value is increased. The presumable reason for this is described in the following. Having a maximum value of the loss tangent at 10° C. or lower to have a low glass transition temperature, the resin having a crosslinked structure as a dispersed phase is plastically deformed to induce shape deformation of the polyvinyl acetal resin as a continuous phase at the micro-level at low temperatures, leading to a higher elongation rate. At high temperatures, the resin having a crosslinked structure as a dispersed phase does not become too soft because of its crosslinked structure, and the polyvinyl acetal resin as a continuous phase exerts toughness because of the aggregation force generated by hydrogen bonding.

The temperature at which the loss tangent derived from the polyvinyl acetal resin reaches the maximum value is not particularly limited as long as it is 40° C. or higher, and is preferably 50° C. or higher and more preferably 60° C. or higher.

The temperature at which the loss tangent derived from the resin having a crosslinked structure reaches the maximum value is not particularly limited as long as it is 10° C. or lower, and is preferably 0° C. or lower and more preferably −10° C. or lower.

According to the polyvinyl acetal resin composition of the present invention, in measurement of the dynamic viscoelasticity spectrum at a frequency of 10 Hz, a tensile storage elastic modulus is preferably $1 \times 10^7$ to $3 \times 10^9$ Pa·s in a range covering to 80% or more of a temperature range from a temperature at which the loss tangent derived from the polyvinyl acetal resin reaches the maximum value to a temperature at which the loss tangent derived from the resin having a crosslinked structure reaches the maximum value.

By adjusting the tensile storage elastic modulus to the above range, the polyvinyl acetal resin composition can exert more excellent mechanical strength over a wide temperature range from low temperatures to high temperatures. More preferably, the lower limit of the tensile storage elastic modulus is $5 \times 10^7$ Pa·s and the upper limit is $2 \times 10^9$ Pa·s.

The dynamic viscoelasticity spectrum at a frequency of 10 Hz can be measured, for example, with a dynamic viscoelasticity measuring apparatus such as DVA-200 (IT Measurement Co., Ltd.) at a frequency of 10 Hz at a rate of temperature rise of 5° C./min.

For the purpose of providing a polyvinyl acetal resin composition having a continuous phase and a dispersed phase and adjusting the dynamic viscoelasticity spectrum to the above range, the compositions, physical properties such as the glass transition temperature, and the amounts of the polyvinyl acetal resin and the resin having a crosslinked structure can be controlled and the method for producing the polyvinyl acetal resin composition can be adjusted.

For example, in 100% by weight of the total of the polyvinyl acetal resin and the resin having a crosslinked structure, the amount of the polyvinyl acetal resin is preferably 30 to 95% by weight and the amount of the resin having a crosslinked structure is preferably 5 to 70% by weight. More preferably, the amount of the polyvinyl acetal resin is 40 to 85% by weight and the amount of the resin having a crosslinked structure is 15 to 60% by weight. Still more preferably, the amount of the polyvinyl acetal resin is 45 to 60% by weight and the amount of the resin having a crosslinked structure is 40 to 55% by weight. If the amounts are not within these ranges, the dynamic viscoelasticity spectrum cannot be adjusted to the above range. As a result, excellent mechanical strength may not be exerted over a wide temperature range from low temperatures to high temperatures.

For adjusting the amounts of the polyvinyl acetal resin and the resin having a crosslinked structure to the above ranges, for example, in a case where the polyvinyl acetal resin composition of the present invention is provided by polymerization of monomers constituting a (meth)acrylic resin in the presence of the polyvinyl acetal resin, the amount of the monomers constituting the (meth)acrylic resin relative to the polyvinyl acetal resin or the amount of a polymerization initiator is preferably adjusted.

The polyvinyl acetal resin is not particularly limited, and is preferably a polyvinyl acetal resin obtainable by acetalization of polyvinyl alcohol having a polymerization degree of 600 to 5000 and saponification degree of 80 mol % or more. The use of such polyvinyl acetal resin allows the polyvinyl acetal resin composition to exert more excellent mechanical strength over a wide temperature range from low temperatures to high temperatures.

If the polymerization degree of the polyvinyl alcohol is less than 600, the mechanical strength of the polyvinyl acetal resin composition may be lowered. If the polymerization degree of the polyvinyl alcohol is more than 5000, the solution viscosity may be abnormally high at the time of acetalization of the polyvinyl alcohol, which makes the acetalization difficult. The lower limit of the polymerization degree of the polyvinyl alcohol is more preferably 1000, and the upper limit thereof is more preferably 4500.

If the saponification degree of the polyvinyl alcohol is less than 80 mol %, the solubility of the polyvinyl alcohol in water is lowered, possibly leading to difficulty in acetalization. In addition, since the amount of hydroxy groups in the polyvinyl alcohol is small, acetalization may be less likely to progress. The lower limit of the saponification degree of the polyvinyl alcohol is more preferably 85 mol %.

If the saponification degree of the polyvinyl alcohol is more than 99.8 mol %, the viscosity of a polyvinyl alcohol aqueous solution is increased too much, leading to difficulty in acetalization. The upper limit of the saponification degree of the polyvinyl alcohol is 99.8 mol % and is preferably 98.5 mol %.

The acetalization method is not particularly limited and may be a conventionally known method. An exemplary method includes adding an aldehyde to a polyvinyl alcohol aqueous solution in the presence of an acid catalyst such as hydrochloric acid.

The aldehyde is not particularly limited, and examples thereof include formaldehyde (including paraformaldehyde), acetaldehyde (including paraacetaldehyde), propionaldehyde, butyl aldehyde, amyl aldehyde, hexyl aldehyde, heptyl aldehyde, 2-ethyl hexyl aldehyde, cyclohexyl aldehyde, furfural, glyoxal, glutaraldehyde, benzaldehyde, 2-methyl benzaldehyde, 3-methyl benzaldehyde, 4-methyl benzaldehyde, p-hydroxy benzaldehyde, m-hydroxy benzaldehyde, phenyl acetaldehyde, and β-phenyl propionaldehyde. In particular, preferred are formaldehyde (including paraformaldehyde), acetaldehyde (including paracetaldehyde), butyl aldehyde, cyclohexyl aldehyde, and benzaldehyde in terms of productivity, characteristic balance, and the like. Each of these aldehydes may be used alone, or two or more of these may be used in combination.

In terms of the acetalization degree (herein also referred to as the acetoacetalization degree in the case where the acetal group is an acetoacetal group, and also referred to as the butyralization degree in the case where the acetal group is a butyral group) of the polyvinyl acetal resin, the preferable lower limit is 40 mol % and the preferable upper limit is 80 mol % in both cases where a single aldehyde is used and where two or more aldehydes are used in combination. If the acetalization degree is less than 40 mol %, hydrogen bonding between molecules of the polyvinyl acetal resin is great to increase the aggregation force too much, possibly lowering the elongation rate especially at low temperatures. If the acetalization degree is more than 80 mol %, hydrogen bonding between molecules of the polyvinyl acetal resin is weak to lower the aggregation force too much, possibly lowering the breaking strength especially at high temperatures. The lower limit of the acetalization degree is more preferably 55 mol % and the upper limit thereof is more preferably 75 mol %.

In the method for calculating the acetalization degree employed here, since an acetal group in the polyvinyl acetal resin is formed by two acetalized hydroxy groups of polyvinyl alcohol, the acetalization degree is calculated by counting the two acetalized hydroxy groups.

The resin having a crosslinked structure is preferably a resin having a lower glass transition temperature than the polyvinyl acetal resin, and specific examples thereof include a (meth)acrylic resin, silicone rubber, polyisoprene, polybutadiene, polyisobutylene, polyethylene, polypropylene, polyvinylidene chloride, polyvinylidene fluoride, polyacetal, polyurethane, polyoxymethylene, and polyoxyethylene each having a crosslinked structure. Particularly preferred is a (meth)acrylic resin having a crosslinked structure because the glass transition temperature is easily controlled, the crosslinked structure is easily introduced, and the dynamic viscoelasticity spectrum of the polyvinyl acetal resin composition is easily adjusted to the above range.

The method for introducing the crosslinked structure into the resin is not particularly limited, and examples thereof include a method in which functional groups reactive with each other are preliminary introduced into the polymer structure and crosslinks are formed, a method in which a crosslinking agent having two or more functional groups reactive with a functional group present in the polymer structure is used for crosslinking, a method in which a radical generator having an hydrogen abstraction ability, such as peroxides, is used for crosslinking polymers, and a method in which crosslinks are formed by irradiation with an electron beam. Particularly preferred is a method in which functional groups reactive with each other are preliminary introduced into the polymer structure and crosslinks are formed, because the structure comprising a continuous phase and a dispersed phase is easily controlled and productivity is excellent.

The (meth)acrylic resin having a crosslinked structure is not particularly limited, and is preferably a resin having a maximum value of the loss tangent at 10° C. or lower when the dynamic viscoelasticity spectrum thereof is solely measured at a frequency of 10 Hz.

Examples of the monomers constituting the (meth)acrylic resin having a crosslinked structure include methyl (meth)acrylate, ethyl (meth)acrylate, n-propyl (meth)acrylate, i-propyl (meth)acrylate, n-butyl (meth)acrylate, i-butyl (meth)acrylate, t-butyl (meth)acrylate, 2-ethylhexyl (meth)acrylate, octyl (meth)acrylate, propyl (meth)acrylate, 2-ethyloctyl (meth)acrylate, nonyl (meth)acrylate, isononyl (meth)acrylate, decyl (meth)acrylate, isodecyl (meth)acrylate, lauryl (meth)acrylate, isotetradecyl (meth)acrylate, cyclohexyl (meth)acrylate, and benzyl (meth)acrylate. Particularly preferred are ethyl (meth)acrylate, n-butyl (meth)acrylate, 2-ethylhexyl (meth)acrylate, and octyl (meth)acrylate in terms of productivity, characteristic balance, and the like. Each of these monomers may be used alone, or two or more of these may be used in combination.

Examples of a combination of monomers for crosslink formation, among monomers constituting the (meth)acrylic resin having a crosslinked structure, include a combination of a (meth)acrylic acid ester monomer having a glycidyl group and a (meth)acrylic acid monomer or (meth)acrylic acid ester monomer having a carboxyl group or hydroxy group, a combination of a (meth)acrylic acid ester monomer having an isocyanate group and a (meth)acrylic acid ester monomer having a hydroxy group, amino group, or carboxyl group, a combination of a (meth)acrylic acid ester monomer having a hydroxy group and a (meth)acrylic acid ester monomer having an alkoxysilane group, and a combination of (meth)acrylic acid ester monomers having a vinyl group. Particularly preferred is a combination of a (meth)acrylic acid ester monomer having a glycidyl group and a (meth)acrylic acid ester monomer having a carboxyl group or hydroxy group because the crosslinking reaction is easily controlled. Each of these monomers may be used alone, or two or more of these may be used in combination.

The (meth)acrylic acid ester monomer having a glycidyl group is not particularly limited, and examples thereof include glycidyl (meth)acrylate. The (meth)acrylic acid monomer or (meth)acrylic acid ester monomer having a carboxyl group is not particularly limited, and examples thereof include (meth)acrylic acid.

Examples of the (meth)acrylic acid ester monomer having a hydroxy group include 2-hydroxyethyl (meth)acrylate.

The (meth)acrylic acid ester monomer having an isocyanate group is not particularly limited, and examples thereof include 2-isocyanatoethyl (meth)acrylate.

The (meth)acrylic acid ester monomer having an amino group is not particularly limited, and examples thereof include dimethylaminoethyl (meth)acrylate.

The (meth)acrylic acid ester monomer having an alkoxysilane group is not particularly limited, and examples thereof include 3-(trimethoxysilyl)propyl (meth)acrylate.

The (meth)acrylic acid ester monomer having a vinyl group is not particularly limited and examples thereof include 2-(2-vinyloxyethoxy)ethyl (meth)acrylate.

The crosslinked structure of the (meth)acrylic resin can be confirmed by the following method.

First, a (meth)acrylic resin sample preliminary subjected to crosslinking treatment is immersed in tetrahydrofuran for 24 hours while being shaken at a room temperature. Then, the sample is filtered through a mesh, thereby separating an insoluble component and a soluble component. The insoluble component is heated at 110° C. for an hour to be dried, and then weighed. The soluble component, after removal of tetrahydrofuran by heat-drying, is re-dissolved in deuterated dimethyl sulfoxide (DMSO-d6; deuteration rate of 99.9%) or deuterated tetrahydrofuran (THF-d8; deuteration rate of 99.9%) in such a manner that the concentration thereof is set to 1.0% by weight. The resulting solution is subjected to composition analysis by NMR. Then, the gel fraction of the (meth)acrylic resin is calculated using the following equation. The gel fraction of not 0% by weight indicates the presence of the crosslinked structure.

Gel fraction (% by weight) of (meth)acrylic resin= $\{1-(W_1-W_2)\times R_2/(W_1\times R_1)\}\times 100$.

$W_1$: Weight (g) of resin sample before immersion, $W_2$: Weight (g) of insoluble component after immersion and drying, $R_1$: (Meth)acrylic resin content (% by weight) of resin, $R_2$: (Meth) acrylic resin content (% by weight) of soluble component.

The gel fraction of the (meth)acrylic resin having a crosslinked structure is not particularly limited as it is determined in accordance with the application thereof, and is preferably 10 to 98% by weight. Setting the gel fraction within such a range allows the polyvinyl acetal resin composition to exert more excellent mechanical strength over a wide temperature range from low temperatures to high temperatures.

If the (meth)acrylic resin having a crosslinked structure has a gel fraction of less than 10% by weight, the breaking strength of the polyvinyl acetal resin composition may be lowered at high temperatures. If the (meth)acrylic resin having a crosslinked structure has a gel fraction of more than 98% by weight, the elongation rate of the polyvinyl acetal resin composition may be lowered at low temperatures. The lower limit and the upper limit of the gel fraction of the (meth) acrylic resin are more preferably 30% by weight and 95% by weight, respectively, and particularly preferably 80% by weight and 92% by weight, respectively.

The polyvinyl acetal resin composition of the present invention may further contain a compatibilizer as long as it does not damage the structure comprising a continuous phase and a dispersed phase.

The compatibilizer is not particularly limited, and examples thereof include a block copolymer or graft copolymer of the polyvinyl acetal resin and the resin having a crosslinked structure, and a compatibilizer having an ionic interaction (e.g., a compound or polymer having a specific functional group). Particularly preferred as the compatibilizer is a block copolymer or graft copolymer of the polyvinyl acetal resin and the resin having a crosslinked structure because the resulting polyvinyl acetal resin composition has more favorable mechanical characteristics at high temperatures and low temperatures. The amount of the compatibilizer is not particularly limited, and is preferably about 0 to 50 parts by weight for 100 parts by weight of the total of the polyvinyl acetal resin and the resin having a crosslinked structure.

The polyvinyl acetal resin composition of the present invention may or may not contain a plasticizer. Preferably, the polyvinyl acetal resin composition of the present invention does not contain a plasticizer. Not containing a plasticizer enables suppression of softening of the polyvinyl acetal resin composition at high temperatures, leading to excellent mechanical strength over a wider temperature range.

The method for producing the polyvinyl acetal resin composition of the present invention is not particularly limited, and may be a blending method, a two-stage reaction method, or the like.

In the blending method, the polyvinyl acetal resin and the resin having a crosslinked structure are separately prepared and then mixed (blended). The mixing method is not particularly limited, and examples thereof include mixing by melt-kneading and mixing of solutions of respective resins. In the two-stage reaction method, the polyvinyl acetal resin is prepared first, and monomers which constitute the resin having a crosslinked structure is polymerized in the presence of the polyvinyl acetal resin.

In the polyvinyl acetal resin composition obtainable by the two-stage reaction method, in comparison with that obtained by the blending method, the resin having a crosslinked structure as a dispersed phase has a smaller average dispersion size (diameter). The reason for this is presumably as follows. In polymerization of the monomers constituting in the resin having a crosslinked structure, a copolymer obtainable by grafting the resin having a crosslinked structure with the polyvinyl acetal resin is partly formed. The copolymer having an affinity for both the continuous phase and the dispersed phase exhibits a surfactant action (compatibilizing action). This action stabilizes the dispersed phase, resulting in a smaller average dispersion size (diameter). The polyvinyl acetal resin composition including a dispersed phase having a small average diameter has a structure comprising a continuous phase and a dispersed phase as described above and satisfies a dynamic viscoelasticity spectrum as described above, exerting more excellent mechanical strength.

Accordingly, the two-stage reaction method is preferable among the methods for producing the polyvinyl acetal resin composition of the present invention. Particularly preferably, the polyvinyl acetal resin composition of the present invention is obtained by polymerization of monomers which constitute a (meth)acrylic resin having a crosslinked structure in the presence of the polyvinyl acetal resin.

The copolymer (herein, also referred to as a graft copolymer) obtainable by grafting the resin having a crosslinked structure with the polyvinyl acetal resin is a polymer in which the resin having a crosslinked structure as a side chain is bonded to the polyvinyl acetal resin as a main chain in a branched shape.

The molecular weight of the graft copolymer is not particularly limited, and the number average molecular weight (Mn) is preferably 10000 to 400000 and the weight average molecular weight (Mw) is preferably 20000 to 800000. The ratio thereof (Mw/Mn) is preferably 2.0 to 40.

Setting the Mn, Mw, and Mw/Mn within such ranges controls the balance between the mechanical strength and flexibility of the polyvinyl acetal resin composition. In addition, such setting prevents the slurry viscosity from increasing too much.

The grafting ratio (ratio of the resin having a crosslinked structure to the polyvinyl acetal resin in the graft copolymer) of the graft copolymer is determined in accordance with the application of the composition and is not particularly limited. Preferably, the grafting ratio is 1 to 900% by weight. Setting the grafting ratio within such a range controls the balance between the mechanical strength and flexibility of the polyvinyl acetal resin composition. The graft copolymer more preferably has a grafting ratio of 2% by weight or more and not more than 150% by weight in terms of tensile elongation. For the purpose of achieving both the tensile elongation and breaking strength in a wide temperature range, the grafting ratio is particularly preferably 5% by weight or more and not more than 46% by weight.

The grafting ratio indicates a ratio of the resin having a crosslinked structure to the polyvinyl acetal resin in the graft copolymer, and may be calculated by measuring an isolated graft polymer by NMR, obtaining the weight of the polyvinyl acetal resin and the weight of the resin having a crosslinked structure, and calculating the ratio using the following equation:

Grafting ratio (% by weight)={(Weight of resin having crosslinked structure)/(Weight of polyvinyl acetal resin)}×100.

The polyvinyl acetal resin composition of the present invention exerts excellent mechanical strength over a wide temperature range from low temperatures to high temperatures.

In terms of a film formed from the polyvinyl acetal resin composition of the present invention, the lower limit of the tensile elongation measured with a tensile machine at −20 to 60° C. is preferably 150% and the lower limit of the breaking strength measured with a tensile machine at −20 to 60° C. is preferably 30 N/mm$^2$.

The application of the polyvinyl acetal resin composition of the present invention is not particularly limited, and examples thereof include materials of sheet-shaped molded article such as interlayer films for laminated glass and packaging films, wash primers for metal treatment, various coating compositions, printing ink, adhesives, resin processing agents, and binders for ceramic firing.

Advantageous Effects of Invention

The present invention can provide a polyvinyl acetal resin composition exerting excellent mechanical strength over a wide temperature range from low temperatures to high temperatures.

DESCRIPTION OF EMBODIMENTS

The present invention is described in more detail with reference to, but not limited to, the following examples.

Example 1

Production of Film of Polyvinyl Acetal Resin Composition

To a reaction vessel equipped with a thermometer, a stirrer, a nitrogen inlet tube, and a cooling tube were added 25 parts by weight of a polyvinyl acetal resin (polymerization degree of 1700, butyralization degree of 67.0 mol %, hydroxy group content of 32.0 mol %, acetyl group content of 1.0 mol %), 20 parts by weight of 2-ethyl hexyl acrylate, 3.3 parts by weight of glycidyl methacrylate and 1.7 parts by weight of acrylic acid as monomers for crosslink formation, and 100 parts by weight of ethyl acetate as a polymerization solvent. The mixture was stirred so that the polyvinyl acetal resin was dissolved therein. Next, nitrogen gas was introduced into the reaction vessel for 30 minutes so that the air inside was replaced with nitrogen, and the mixture in the reaction vessel was heated to 70° C. with stirring. After 30 minutes, 0.1 parts by weight of t-butyl peroxy-2-ethylhexanoate as a polymerization initiator was diluted with 5 parts by weight of ethyl acetate to give a polymerization initiator solution, and the solution was added dropwise into the reaction vessel over 3 hours. The reaction liquid was further reacted at 70° C. for 3 hours and then cooled. The resulting solution was diluted with a dilution solvent (mixed solvent of methanol and toluene, weight ratio between methanol and toluene was 1:2) to give a solution having a solid content of 20% by weight.

The solution was applied with a coater to a PET film preliminary subjected to release treatment in such a manner that the thickness after drying was set to 50 μm. The applied solution was dried at 80° C. for an hour and heated at 130° C. for 10 minutes so that a crosslinking reaction was carried out, thereby forming a film comprising a polyvinyl acetal resin composition. The obtained film was sectioned with an ultramicrotome and the resulting sample was observed with a transmission electron microscope. Then, a structure was observed, in which the (meth)acrylic resin having a crosslinked structure was dispersed as a dispersed phase in the polyvinyl acetal resin as a continuous phase. A photograph taken with a transmission electron microscope was subjected to analysis with an image analyzer. By averaging the dispersion sizes (diameters) of randomly chosen 100 particles of the dispersed phase, the average dispersion size of the dispersed phase was determined. Table 1 shows the result.

(Measurement of Dynamic Viscoelasticity)

The resulting films were laminated by heat-pressing to give a sheet having a thickness of 500 μm. The tensile storage elastic modulus and tensile loss elastic modulus were measured with a dynamic viscoelasticity measuring apparatus (IT Measurement Co., Ltd., DVA-200) at a frequency of 10 Hz and at a rate of temperature rise of 5° C./min. A graph was created in which the horizontal axis represents the temperature and the vertical axis represents the loss tangent (tan δ). Based on the graph, the temperature at which the loss tangent reached the maximum value was determined.

(Measurement of Gel Fraction of Resin Having Crosslinked Structure)

The resulting film was immersed in tetrahydrofuran at a room temperature for 24 hours while being shaken. The resulting object was filtered through a mesh, thereby separating an insoluble component and a soluble component. Next, the insoluble component was dried by heating at 110° C. for an hour, and then weighed. The soluble component, after removal of tetrahydrofuran by heat-drying, was dissolved again in deuterated tetrahydrofuran (THF-d8; deuteration rate of 99.9%) in such a manner that the concentration thereof is set to 1.0% by weight. The resulting solution was subjected to composition analysis by NMR. Then, the gel fraction of the resin component having a crosslinked structure was calculated using the following equation:

Gel fraction (% by weight) of resin component having crosslinked structure={1−($W_1$−$W_2$)×$R_2$/($W_1$×$R_1$)}×100.

$W_1$: Weight (g) of film sample before immersion, $W_2$: Weight (g) of insoluble component after immersion and drying, $R_1$: (Meth)acrylic resin content (% by weight) of film sample, $R_2$: (Meth) acrylic resin content (% by weight) of soluble component.

(Measurement of Grafting Ratio)

The obtained film was washed with xylene and methanol, and the graft polymer was isolated. The isolated graft polymer was subjected to NMR (JEOL Ltd., JNM-ECA400) measurement, and the grafting ratio was obtained using the following equation. Table 1 shows the result.

Grafting ratio (% by weight)={(Weight of resin having crosslinked structure)/(Weight of polyvinyl acetal resin)}×100.

Example 2

Production of Film of Polyvinyl Acetal Resin Composition

To a reaction vessel equipped with a thermometer, a stirrer, a nitrogen inlet tube, and a cooling tube were added 25 parts by weight of a polyvinyl acetal resin (polymerization degree of 1500, butyralization degree of 48.0 mol %, acetoacetalization degree of 24 mol %, hydroxy group content of 27.0 mol %, acetyl group content of 1.0 mol %), 20 parts by weight of n-butyl acrylate, 3.3 parts by weight of glycidyl methacrylate and 1.7 parts by weight of acrylic acid as monomers for crosslink formation, and 100 parts by weight of ethyl acetate as a polymerization solvent. The mixture was stirred so that the polyvinyl acetal resin was dissolved therein. Next, nitrogen gas was introduced into the reaction vessel for 30 minutes so that the air inside was replaced with nitrogen, and the mixture in the reaction vessel was heated to 70° C. with stirring. After 30 minutes, 0.1 parts by weight of t-butyl peroxy-2-ethylhexanoate as a polymerization initiator was diluted with 5 parts by weight of ethyl acetate to give a polymerization initiator solution, and the solution was added dropwise into the reaction vessel over 3 hours. The reaction liquid was further reacted at 70° C. for 3 hours and then cooled. The resulting solution was diluted with a dilution solvent (mixed solvent of methanol and toluene, weight ratio between methanol and toluene was 1:2) to give a solution having a solid content of 20% by weight.

The solution was applied with a coater to a PET film preliminary subjected to release treatment in such a manner that the thickness after drying was set to 50 μm. The applied solution was dried at 80° C. for an hour and heated at 130° C. for 10 minutes so that a crosslinking reaction was carried out, thereby forming a film comprising a polyvinyl acetal resin composition. The obtained film was sectioned with an ultramicrotome and the resulting sample was observed with a transmission electron microscope. Then, a structure was observed, in which the (meth)acrylic resin having a crosslinked structure was dispersed as a dispersed phase in the polyvinyl acetal resin as a continuous phase. The average dispersion size of the dispersed phase was measured. Table 1 shows the result.

(Measurement of Dynamic Viscoelasticity)

The dynamic viscoelasticity was measured in the same manner as in Example 1.

(Measurement of Gel Fraction of Resin Component Having Crosslinked Structure)

The gel fraction of the resin component having a crosslinked structure was measured in the same manner as in Example 1.

(Measurement of Grafting Ratio)

The grafting ratio was measured in the same manner as in Example 1.

Example 3

Production of Film of Polyvinyl Acetal Resin Composition

To a reaction vessel equipped with a thermometer, a stirrer, a nitrogen inlet tube, and a cooling tube were added 25 parts by weight of a polyvinyl acetal resin (polymerization degree of 1700, butyralization degree of 67.0 mol %, hydroxy group content of 32.0 mol %, acetyl group content of 1.0 mol %), 5 parts by weight of 2-ethyl hexyl acrylate, 0.8 parts by weight of glycidyl methacrylate and 0.4 parts by weight of acrylic acid as monomers for crosslink formation, and 100 parts by weight of ethyl acetate as a polymerization solvent. The mixture was stirred so that the polyvinyl acetal resin was dissolved therein. Next, nitrogen gas was introduced into the reaction vessel for 30 minutes so that the air inside was replaced with nitrogen, and the mixture in the reaction vessel was heated to 70° C. with stirring. After 30 minutes, 0.1 parts by weight of t-butyl peroxy-2-ethylhexanoate as a polymerization initiator was diluted with 5 parts by weight of ethyl acetate to give a polymerization initiator solution, and the solution was added dropwise into the reaction vessel over 3 hours. Then, the reaction liquid was further reacted at 70° C. for 3 hours and then cooled. The resulting solution was diluted with a dilution solvent (mixed solvent of methanol and toluene, weight ratio between methanol and toluene was 1:2) to give a solution having a solid content of 20% by weight.

The solution was applied with a coater to a PET film preliminary subjected to release treatment in such a manner that the thickness after drying was set to 50 μm. The applied solution was dried at 80° C. for an hour and heated at 130° C. for 10 minutes so that a crosslinking reaction was carried out, thereby forming a film comprising a polyvinyl acetal resin composition. The obtained film was sectioned with an ultramicrotome and the resulting sample was observed with a transmission electron microscope. Then, a structure was observed, in which the (meth)acrylic resin having a crosslinked structure was dispersed as a dispersed phase in the polyvinyl acetal resin as a continuous phase. The average dispersion size of the dispersed phase was measured. Table 1 shows the result.

(Measurement of Dynamic Viscoelasticity)

The dynamic viscoelasticity was measured in the same manner as in Example 1.

(Measurement of Gel Fraction of Resin Component Having Crosslinked Structure)

The gel fraction of the resin component having a crosslinked structure was measured in the same manner as in Example 1.

(Measurement of Grafting Ratio)

The grafting ratio was measured in the same manner as in Example 1.

Example 4

Production of Film of Polyvinyl Acetal Resin Composition

To a reaction vessel equipped with a thermometer, a stirrer, a nitrogen inlet tube, and a cooling tube were added 25 parts by weight of a polyvinyl acetal resin (polymerization degree of 1700, butyralization degree of 67.0 mol %, hydroxy group content of 32.0 mol %, acetyl group content of 1.0 mol %), 7.3 parts by weight of n-butyl acrylate and 15 parts by weight of ethyl acrylate, 1.8 parts by weight of glycidyl methacrylate and 0.9 parts by weight of acrylic acid as monomers for crosslink formation, and 100 parts by weight of ethyl acetate as a polymerization solvent. The mixture was stirred so that the polyvinyl acetal resin was dissolved therein. Next, nitrogen gas was introduced into the reaction vessel for 30 minutes so that the air inside was replaced with nitrogen, and the mixture in the reaction vessel was heated to 70° C. with stirring. After 30 minutes, 0.1 parts by weight of t-butyl peroxy-2-ethylhexanoate as a polymerization initiator was diluted with 5 parts by weight of ethyl acetate to give a polymerization initiator solution, and the solution was added dropwise into the reaction vessel over 3 hours. Then, the reaction liquid was further reacted at 70° C. for 3 hours and then cooled. The resulting solution was diluted with a dilution solvent (mixed solvent of methanol and toluene, weight ratio between methanol and toluene was 1:2) to give a solution having a solid content of 20% by weight.

The solution was applied with a coater to a PET film preliminary subjected to release treatment in such a manner that the thickness after drying was set to 50 μm. The applied solution was dried at 80° C. for an hour and heated at 130° C. for 10 minutes so that a crosslinking reaction was carried out, thereby forming a film comprising a polyvinyl acetal resin composition. The obtained film was sectioned with an ultramicrotome and the resulting sample was observed with a transmission electron microscope. Then, a structure was observed, in which the (meth)acrylic resin having a crosslinked structure was dispersed as a dispersed phase in the polyvinyl acetal resin as a continuous phase. The average dispersion size of the dispersed phase was measured. Table 1 shows the result.

(Measurement of Dynamic Viscoelasticity)

The dynamic viscoelasticity was measured in the same manner as in Example 1.

(Measurement of Gel Fraction of Resin Component Having Crosslinked Structure)

The gel fraction of the resin component having a crosslinked structure was measured in the same manner as in Example 1.

(Measurement of Grafting Ratio)

The grafting ratio was measured in the same manner as in Example 1.

Example 5

Production of Film of Polyvinyl Acetal Resin Composition

To a reaction vessel equipped with a thermometer, a stirrer, a nitrogen inlet tube, and a cooling tube were added 25 parts by weight of a polyvinyl acetal resin (polymerization degree of 1700, butyralization degree of 67.0 mol %, hydroxy group content of 32.0 mol %, acetyl group content of 1.0 mol %), 22.7 parts by weight of ethyl acrylate, 1.5 parts by weight of glycidyl methacrylate and 0.8 parts by weight of acrylic acid as monomers for crosslink formation, and 100 parts by weight of ethyl acetate as a polymerization solvent. The mixture was stirred so that the polyvinyl acetal resin was dissolved therein. Next, nitrogen gas was introduced into the reaction vessel for 30 minutes so that the air inside was replaced with nitrogen, and the mixture in the reaction vessel was heated to 70° C. with stirring. After 30 minutes, 0.1 parts by weight of t-butyl peroxy-2-ethylhexanoate as a polymerization initiator was diluted with 5 parts by weight of ethyl acetate to give a polymerization initiator solution, and the solution was added dropwise into the reaction vessel over 3 hours. Then, the reaction liquid was further reacted at 70° C. for 3 hours and then cooled. The resulting solution was diluted with a dilution solvent (mixed solvent of methanol and toluene, weight ratio between methanol and toluene was 1:2) to give a solution having a solid content of 20% by weight.

The solution was applied with a coater to a PET film preliminary subjected to release treatment in such a manner that the thickness after drying was set to 50 μm. The applied solution was dried at 80° C. for an hour and heated at 130° C. for 10 minutes so that a crosslinking reaction was carried out, thereby forming a film comprising a polyvinyl acetal resin composition. The obtained film was sectioned with an ultramicrotome and the resulting sample was observed with a transmission electron microscope. Then, a structure was observed, in which the (meth)acrylic resin having a crosslinked structure was dispersed as a dispersed phase in the polyvinyl acetal resin as a continuous phase. The average dispersion size of the dispersed phase was measured. Table 1 shows the result.

(Measurement of Dynamic Viscoelasticity)

The dynamic viscoelasticity was measured in the same manner as in Example 1.

(Measurement of Gel Fraction of Resin Component Having Crosslinked Structure)

The gel fraction of the resin component having a crosslinked structure was measured in the same manner as in Example 1.

(Measurement of Grafting Ratio)

The grafting ratio was measured in the same manner as in Example 1.

Example 6

Production of Film of Polyvinyl Acetal Resin Composition

To a reaction vessel equipped with a thermometer, a stirrer, a nitrogen inlet tube, and a cooling tube were added 25 parts by weight of a polyvinyl acetal resin (polymerization degree of 1700, butyralization degree of 67.0 mol %, hydroxy group content of 32.0 mol %, acetyl group content of 1.0 mol %), 23.5 parts by weight of n-octyl methacrylate, 1 part by weight of glycidyl methacrylate and 0.5 parts by weight of acrylic acid as monomers for crosslink formation, and 100 parts by weight of ethyl acetate as a polymerization solvent. The mixture was stirred so that the polyvinyl acetal resin was dissolved therein. Next, nitrogen gas was introduced into the reaction vessel for 30 minutes so that the air inside was replaced with nitrogen, and the mixture in the reaction vessel was heated to 70° C. with stirring. After 30 minutes, 0.5 parts by weight of t-butyl peroxy-2-ethylhexanoate as a polymerization initiator was diluted with 5 parts by weight of ethyl acetate to give a polymerization initiator solution, and the solution was added dropwise into the reaction vessel over 3 hours. Then, the reaction liquid was further reacted at 70° C. for 3 hours and then cooled. The resulting solution was diluted with a dilution solvent (mixed solvent of methanol and toluene, weight ratio between methanol and toluene was 1:2) to give a solution having a solid content of 20% by weight.

The solution was applied with a coater to a PET film preliminary subjected to release treatment in such a manner that the thickness after drying was set to 50 μm. The applied solution was dried at 80° C. for an hour and heated at 130° C. for 10 minutes so that a crosslinking reaction was carried out, thereby forming a film comprising a polyvinyl acetal resin composition. The obtained film was sectioned with an ultramicrotome and the resulting sample was observed with a transmission electron microscope. Then, a structure was observed, in which the (meth)acrylic resin having a crosslinked structure was dispersed as a dispersed phase in the polyvinyl acetal resin as a continuous phase. The average dispersion size of the dispersed phase was measured. Table 1 shows the result.

(Measurement of Dynamic Viscoelasticity)

The dynamic viscoelasticity was measured in the same manner as in Example 1.

(Measurement of Gel Fraction of Resin Component Having Crosslinked Structure)

The gel fraction of the resin component having a crosslinked structure was measured in the same manner as in Example 1.

(Measurement of Grafting Ratio)

The grafting ratio was measured in the same manner as in Example 1.

Example 7

Production of Film of Polyvinyl Acetal Resin Composition

An amount of 100 parts by weight of polyvinyl alcohol (polymerization degree of 1700, saponification degree of 99 mol %) and 120 parts by weight of 2-ethyl hexyl aldehyde were added to 1000 parts by weight of a mixed solvent containing ethanol and toluene (weight ratio between ethanol and toluene was 1:1), and hydrochloric acid was further added in such a manner that the concentration thereof was set to 0.1 M. The solution was held at 65° C. for 3 hours with stirring so that an acetalization reaction was carried out. After completion of the reaction time, the reaction liquid was cooled and dried in vacuum for removal of the solvent. The resulting resin was dissolved again in tetrahydrofuran and precipitated three times in water to be purified, followed by sufficient drying. As a result, a polyvinyl acetal resin acetalized by 2-ethyl hexyl aldehyde was obtained.

The obtained polyvinyl acetal resin was measured by NMR. The acetalization degree was 60 mol %, the hydroxy group content was 39 mol %, and the acetyl group content was 1 mol %.

Next, to a reaction vessel equipped with a thermometer, a stirrer, a nitrogen inlet tube, and a cooling tube were added 25 parts by weight of the obtained polyvinyl acetal resin, 20 parts by weight of 2-ethyl hexyl acrylate, 3.3 parts by weight of glycidyl methacrylate and 1.7 parts by weight of acrylic acid as monomers for crosslink formation and 100 parts by weight of ethyl acetate as a polymerization solvent. The mixture was stirred so that the polyvinyl acetal resin was dissolved therein. Next, nitrogen gas was introduced into the reaction vessel for 30 minutes so that the air inside was replaced with nitrogen, and the mixture in the reaction vessel was heated to 70° C. with stirring. After 30 minutes, 0.1 parts by weight of t-butyl peroxy-2-ethylhexanoate as a polymerization initiator was diluted with 5 parts by weight of ethyl acetate to give a polymerization initiator solution, and the solution was added dropwise into the reaction vessel over 3 hours. Then, the reaction liquid was further reacted at 70° C. for 3 hours and then cooled. The resulting solution was diluted with a dilution solvent (mixed solvent of methanol and toluene, weight ratio between methanol and toluene was 1:2) to give a solution having a solid content of 20% by weight.

The solution was applied with a coater to a PET film preliminary subjected to release treatment in such a manner that the thickness after drying was set to 50 μm. The applied solution was dried at 80° C. for an hour and heated at 130° C. for 10 minutes so that a crosslinking reaction was carried out, thereby forming a film comprising a polyvinyl acetal resin composition. The obtained film was sectioned with an ultramicrotome and the resulting sample was observed with a transmission electron microscope. Then, a structure was observed, in which the (meth)acrylic resin having a crosslinked structure was dispersed as a dispersed phase in the polyvinyl acetal resin as a continuous phase. The average dispersion size of the dispersed phase was measured. Table 1 shows the result.

(Measurement of Dynamic Viscoelasticity)

The dynamic viscoelasticity was measured in the same manner as in Example 1.

(Measurement of Gel Fraction of Resin Component Having Crosslinked Structure)

The gel fraction of the resin component having a crosslinked structure was measured in the same manner as in Example 1.

(Measurement of Grafting Ratio)

The grafting ratio was measured in the same manner as in Example 1.

Example 8

Production of Film of Polyvinyl Acetal Resin Composition

To a reaction vessel equipped with a thermometer, a stirrer, a nitrogen inlet tube, and a cooling tube were added 25 parts by weight of a polyvinyl acetal resin (polymerization degree of 1700, butyralization degree of 67.0 mol %, hydroxy group content of 32.0 mol %, acetyl group content of 1.0 mol %), 15 parts by weight of 2-ethyl hexyl acrylate, 2 parts by weight of glycidyl methacrylate and 1 part by weight of acrylic acid as monomers for crosslink formation, and 100 parts by weight of ethyl acetate as a polymerization solvent. The mixture was stirred so that the polyvinyl acetal resin was dissolved therein. Next, nitrogen gas was introduced into the reaction vessel for 30 minutes so that the air inside was replaced with nitrogen, and the mixture in the reaction vessel was heated to 70° C. with stirring. After 30 minutes, 0.1 parts by weight of t-hexyl peroxypivalate as a polymerization initiator was diluted with 5 parts by weight of ethyl acetate to give a polymerization initiator solution, and the solution was added dropwise into the reaction vessel over 3 hours. Then, the reaction liquid was further reacted at 70° C. for 3 hours and then cooled. The resulting solution was diluted with a dilution solvent (mixed solvent of methanol and toluene, weight ratio between methanol and toluene was 1:2) to give a solution having a solid content of 20% by weight.

The solution was applied with a coater to a PET film preliminary subjected to release treatment in such a manner that the thickness after drying was set to 50 μm. The applied solution was dried at 80° C. for an hour and heated at 130° C. for 10 minutes so that a crosslinking reaction was carried out, thereby forming a film comprising a polyvinyl acetal resin composition. The obtained film was sectioned with an ultramicrotome and the resulting sample was observed with a transmission electron microscope. Then, a structure was observed, in which the (meth)acrylic resin having a crosslinked structure was dispersed as a dispersed phase in the polyvinyl acetal resin as a continuous phase. The average dispersion size of the dispersed phase was measured. Table 1 shows the result.

(Measurement of Dynamic Viscoelasticity)

The dynamic viscoelasticity was measured in the same manner as in Example 1.

(Measurement of Gel Fraction of Resin Component Having Crosslinked Structure)

The gel fraction of the resin component having a crosslinked structure was measured in the same manner as in Example 1.

(Measurement of Grafting Ratio)

The grafting ratio was measured in the same manner as in Example 1.

Comparative Example 1

Production of Film of Polyvinyl Acetal Resin

An amount of 25 parts by weight of a polyvinyl acetal resin (polymerization degree of 1700, butyralization degree of 67.0 mol %, hydroxy group content of 32.0 mol %, acetyl group content of 1.0 mol %) was diluted with a solvent (mixed solvent of methanol and toluene, weight ratio between methanol and toluene was 1:1) to give a solution having a solid content of 20% by weight.

The solution was applied with a coater to a PET film preliminary subjected to release treatment in such a manner that the thickness after drying was set to 50 μm. The applied solution was dried at 80° C. for an hour, thereby forming a film comprising only the polyvinyl acetal resin. The obtained film was sectioned with an ultramicrotome and the resulting sample was observed with a transmission electron microscope. A structure comprising a continuous phase and a dispersed phase was not observed.

(Measurement of Dynamic Viscoelasticity)

The dynamic viscoelasticity was measured in the same manner as in Example 1.

Comparative Example 2

Production of Film of Polyvinyl Acetal Resin

An amount of 25 parts by weight of a polyvinyl acetal resin (polymerization degree of 1700, butyralization degree of 67.0 mol %, hydroxy group content of 32.0 mol %, acetyl group content of 1.0 mol %) was diluted with a solvent (mixed solvent of methanol and toluene, weight ratio between methanol and toluene was 1:1) to give a solution having a solid content of 20% by weight.

The solution was applied with a coater to a PET film preliminary subjected to release treatment in such a manner that the thickness after drying was set to 25 μm. The applied solution was dried at an ambient temperature for an hour and dried with a hot air dryer at 80° C. for an hour and then at 120° C. for 20 minutes, thereby forming a film comprising the polyvinyl acetal resin.

(Production of Film Comprising (Meth)Acrylic Resin Having Crosslinked Structure)

To a reaction vessel equipped with a thermometer, a stirrer, a nitrogen inlet tube, and a cooling tube were added 20 parts by weight of n-butyl acrylate, 3.3 parts by weight of glycidyl methacrylate and 1.7 parts by weight of acrylic acid as monomers for crosslink formation, and 100 parts by weight of ethyl acetate as a polymerization solvent. Nitrogen gas was introduced into the reaction vessel for 30 minutes so that the air inside was replaced with nitrogen, and the mixture in the reaction vessel was heated to 70° C. with stirring. After 30 minutes, 0.1 parts by weight of t-butyl peroxy-2-ethylhexanoate as a polymerization initiator was diluted with 5 parts by weight of ethyl acetate to give a polymerization initiator solution, and the solution was added dropwise into the reaction vessel over 3 hours. Then, the reaction liquid was further reacted at 70° C. for 3 hours and then cooled.

The solution was applied with a coater to a PET film preliminary subjected to release treatment in such a manner that the thickness after drying was set to 50 μm. The applied solution was dried at 80° C. for an hour and heated at 130° C. for 10 minutes so that a crosslinking reaction was carried out, thereby forming a film comprising a (meth)acrylic resin having a crosslinked structure.

(Production of Laminated Film)

On each face of the film comprising a (meth)acrylic resin having a crosslinked structure, the film comprising a polyvinyl acetal resin was laminated, thereby forming a film having a layered structure. The obtained film was sectioned with an ultramicrotome and the resulting sample was observed with a transmission electron microscope. A structure comprising a continuous phase and a dispersed phase was not observed.

(Measurement of Dynamic Viscoelasticity)

The dynamic viscoelasticity was measured in the same manner as in Example 1.

(Measurement of Gel Fraction of Resin Component Having Crosslinked Structure)

The gel fraction of the resin component having a crosslinked structure was measured in the same manner as in Example 1.

(Measurement of Grafting Ratio)

The grafting ratio was measured in the same manner as in Example 1.

Comparative Example 3

Production of Film Comprising Polyvinyl Acetal Resin Composition

To a reaction vessel equipped with a thermometer, a stirrer, a nitrogen inlet tube, and a cooling tube were added 25 parts by weight of a polyvinyl acetal resin (polymerization degree of 1700, butyralization degree of 67.0 mol %, hydroxy group content of 32.0 mol %, acetyl group content of 1.0 mol %), 20 parts by weight of methyl methacrylate, 3.3 parts by weight of glycidyl methacrylate and 1.7 parts by weight of acrylic acid as monomers for crosslink formation, and 100 parts by weight of ethyl acetate as a polymerization solvent. The mixture was stirred so that the polyvinyl acetal resin was dissolved therein. Next, nitrogen gas was introduced into the reaction vessel for 30 minutes so that the air inside was replaced with nitrogen, and the mixture in the reaction vessel was heated to 70° C. with stirring. After 30 minutes, 0.5 parts by weight of t-butyl peroxy-2-ethylhexanoate as a polymerization initiator was diluted with 5 parts by weight of ethyl acetate to give a polymerization initiator solution, and the solution was added dropwise into the reaction vessel over 3 hours. Then, the reaction liquid was further reacted at 70° C. for 3 hours and then cooled. The resulting solution was diluted with a dilution solvent (mixed solvent of methanol and toluene, weight ratio between methanol and toluene was 1:2) to give a solution having a solid content of 20% by weight.

The solution was applied with a coater to a PET film preliminary subjected to release treatment in such a manner that the thickness after drying was set to 50 μm. The applied solution was dried at 80° C. for an hour and heated at 130° C. for 10 minutes so that a crosslinking reaction was carried out, thereby forming a film comprising a polyvinyl acetal resin composition. The obtained film was sectioned with an ultramicrotome and the resulting sample was observed with a transmission electron microscope. Then, a structure was observed, in which the (meth)acrylic resin having a crosslinked structure was dispersed as a dispersed phase in the polyvinyl acetal resin as a continuous phase. The average dispersion size of the dispersed phase was measured. Table 1 shows the result.

(Measurement of Dynamic Viscoelasticity)

The dynamic viscoelasticity was measured in the same manner as in Example 1.

(Measurement of Gel Fraction of Resin Component Having Crosslinked Structure)

The gel fraction of the resin component having a crosslinked structure was measured in the same manner as in Example 1.

(Measurement of Grafting Ratio)

The grafting ratio was measured in the same manner as in Example 1.

Comparative Example 4

Production of Film of Polyvinyl Acetal Resin Composition

To a reaction vessel equipped with a thermometer, a stirrer, a nitrogen inlet tube, and a cooling tube were added 10 parts by weight of a polyvinyl acetal resin (polymerization degree of 1700, butyralization degree of 67.0 mol %, hydroxy group content of 32.0 mol %, acetyl group content of 1.0 mol %), 40 parts by weight of 2-ethyl hexyl acrylate, 3.3 parts by weight of glycidyl methacrylate and 1.7 parts by weight of acrylic acid as monomers for crosslink formation, and 100 parts by weight of ethyl acetate as a polymerization solvent. The mixture was stirred so that the polyvinyl acetal resin was dissolved therein. Next, nitrogen gas was introduced into the reaction vessel for 30 minutes so that the air inside was replaced with nitrogen, and the mixture in the reaction vessel was heated to 70° C. with stirring. After 30 minutes, 0.1 parts by weight of t-butyl peroxy-2-ethylhexanoate as a polymerization initiator was diluted with 5 parts by weight of ethyl acetate to give a polymerization initiator solution, and the solution was added dropwise into the reaction vessel over 3 hours. Then, the reaction liquid was further reacted at 70° C. for 3 hours and then cooled. The resulting solution was diluted with a dilution solvent (ethyl acetate) to give a solution having a solid content of 20% by weight.

The solution was applied with a coater to a PET film preliminary subjected to release treatment in such a manner that the thickness after drying was set to 50 μm. The applied solution was dried at 80° C. for an hour and heated at 130° C. for 10 minutes so that a crosslinking reaction was carried out, thereby forming a film comprising a polyvinyl acetal resin composition. The obtained film was sectioned with an ultramicrotome and the resulting sample was observed with a transmission electron microscope. Then, a structure was observed, in which the polyvinyl acetal resin was dispersed as a dispersed phase in the (meth)acrylic resin having a crosslinked structure as a continuous phase. The average dispersion size of the dispersed phase was measured. Table 1 shows the result.

(Measurement of Dynamic Viscoelasticity)

The dynamic viscoelasticity was measured in the same manner as in Example 1.

(Measurement of Gel Fraction of Resin Component Having Crosslinked Structure)

The gel fraction of the resin component having a crosslinked structure was measured in the same manner as in Example 1.

(Measurement of Grafting Ratio)

The grafting ratio was measured in the same manner as in Example 1.

Comparative Example 5

Production of Film of Polyvinyl Acetal Resin Composition

To a reaction vessel equipped with a thermometer, a stirrer, a nitrogen inlet tube, and a cooling tube were added 25 parts by weight of a polyvinyl acetal resin (polymerization degree of 1700, butyralization degree of 67.0 mol %, hydroxy group content of 32.0 mol %, acetyl group content of 1.0 mol %), 25 parts by weight of 2-ethyl hexyl acrylate, and 100 parts by weight of ethyl acetate as a polymerization solvent. The mixture was stirred so that the polyvinyl acetal resin was dissolved therein. Next, nitrogen gas was introduced into the reaction vessel for 30 minutes so that the air inside was replaced with nitrogen, and the mixture in the reaction vessel was heated to 70° C. with stirring. After 30 minutes, 0.1 parts by weight of t-butyl peroxy-2-ethylhexanoate as a polymerization initiator was diluted with 5 parts by weight of ethyl acetate to give a polymerization initiator solution, and the solution was added dropwise into the reaction vessel over 3 hours. Then, the reaction liquid was further reacted at 70° C. for 3 hours and then cooled. The resulting solution was diluted with a dilution solvent (mixed solvent of methanol and toluene, weight ratio between methanol and toluene was 1:2) to give a solution having a solid content of 20% by weight.

The solution was applied with a coater to a PET film preliminary subjected to release treatment in such a manner that the thickness after drying was set to 50 μm. The applied solution was dried at 80° C. for an hour, thereby forming a film comprising a polyvinyl acetal resin composition. The obtained film was sectioned with an ultramicrotome and the resulting sample was observed with a transmission electron microscope. Then, a structure was observed, in which the (meth)acrylic resin was dispersed as a dispersed phase in the polyvinyl acetal resin as a continuous phase. The average dispersion size of the dispersed phase was measured. Table 1 shows the result.

(Measurement of Dynamic Viscoelasticity)

The dynamic viscoelasticity was measured in the same manner as in Example 1.

(Measurement of Gel Fraction of Resin Component Having Crosslinked Structure)

The gel fraction of the resin component having a crosslinked structure was measured in the same manner as in Example 1.

(Measurement of Grafting Ratio)

The grafting ratio was measured in the same manner as in Example 1.

Comparative Example 6

Production of Film of Polyvinyl Acetal Resin Composition

To a reaction vessel equipped with a thermometer, a stirrer, a nitrogen inlet tube, and a cooling tube were added 25 parts by weight of a polyvinyl acetal resin (polymerization degree of 1700, butyralization degree of 67.0 mol %, hydroxy group content of 32.0 mol %, acetyl group content of 1.0 mol %), 8.7 parts by weight of n-butyl acrylate, 9.5 parts by weight of cyclohexyl acrylate, 4.5 parts by weight of glycidyl methacrylate and 2.3 parts by weight of acrylic acid as monomers for crosslink formation, and 100 parts by weight of ethyl acetate as a polymerization solvent. The mixture was stirred so that the polyvinyl acetal resin was dissolved therein. Next, nitrogen gas was introduced into the reaction vessel for 30 minutes so that the air inside was replaced with nitrogen, and the mixture in the reaction vessel was heated to 70° C. with stirring. After 30 minutes, 0.1 parts by weight of t-butyl peroxy-2-ethylhexanoate as a polymerization initiator was diluted with 5 parts by weight of ethyl acetate to give a polymerization initiator solution, and the solution was added dropwise into the reaction vessel over 3 hours. Then, the reaction liquid was further reacted at 70° C. for 3 hours and then cooled. The resulting solution was diluted with a dilution solvent (mixed solvent of methanol and toluene, weight ratio between methanol and toluene was 1:2) to give a solution having a solid content of 20% by weight.

The solution was applied with a coater to a PET film preliminary subjected to release treatment in such a manner that the thickness after drying was set to 50 µm. The applied solution was dried at 80° C. for an hour and heated at 130° C. for 10 minutes so that a crosslinking reaction was carried out, thereby forming a film comprising a polyvinyl acetal resin composition. The obtained film was sectioned with an ultramicrotome and the resulting sample was observed with a transmission electron microscope. Then, a structure was observed, in which the (meth)acrylic resin having a crosslinked structure was dispersed as a dispersed phase in the polyvinyl acetal resin as a continuous phase. The average dispersion size of the dispersed phase was measured. Table 1 shows the result.

(Measurement of Dynamic Viscoelasticity)

The dynamic viscoelasticity was measured in the same manner as in Example 1.

(Measurement of Gel Fraction of Resin Component Having Crosslinked Structure)

The gel fraction of the resin component having a crosslinked structure was measured in the same manner as in Example 1.

(Measurement of Grafting Ratio)

The grafting ratio was measured in the same manner as in Example 1.

Comparative Example 7

An amount of 100 parts by weight of polyvinyl alcohol (polymerization degree of 1700, saponification degree of 99 mol %) and 150 parts by weight of 2-ethyl hexyl aldehyde were added to 1000 parts by weight of a mixed solvent containing ethanol and toluene (weight ratio between ethanol and toluene was 1:1), and hydrochloric acid was further added in such a manner that the concentration thereof was set to 0.1 M. The solution was held at 65° C. for 4 hours with stirring so that an acetalization reaction was carried out. After completion of the reaction time, the reaction liquid was cooled and dried in vacuum for removal of the solvent. The resulting resin was dissolved again in tetrahydrofuran and precipitated three times in water to be purified, followed by sufficient drying. As a result, a polyvinyl acetal resin acetalized by 2-ethyl hexyl aldehyde was obtained.

The obtained polyvinyl acetal resin was measured by NMR. The acetalization degree was 69 mol %, the hydroxy group content was 30 mol %, and the acetyl group content was 1 mol %.

Next, to a reaction vessel equipped with a thermometer, a stirrer, a nitrogen inlet tube, and a cooling tube were added 25 parts by weight of the obtained polyvinyl acetal resin, 20 parts by weight of 2-ethyl hexyl acrylate, 0.6 parts by weight of glycidyl methacrylate and 0.3 parts by weight of acrylic acid as monomers for crosslink formation, and 100 parts by weight of ethyl acetate as a polymerization solvent. The mixture was stirred so that the polyvinyl acetal resin was dissolved therein. Next, nitrogen gas was introduced into the reaction vessel for 30 minutes so that the air inside was replaced with nitrogen, and the mixture in the reaction vessel was heated to 70° C. with stirring. After 30 minutes, 0.1 parts by weight of t-butyl peroxy-2-ethylhexanoate as a polymerization initiator was diluted with 5 parts by weight of ethyl acetate to give a polymerization initiator solution, and the solution was added dropwise into the reaction vessel over 3 hours. Then, the reaction liquid was further reacted at 70° C. for 3 hours and then cooled. The resulting solution was diluted with a dilution solvent (mixed solvent of methanol and toluene, weight ratio between methanol and toluene was 1:2) to give a solution having a solid content of 20% by weight.

The solution was applied with a coater to a PET film preliminary subjected to release treatment in such a manner that the thickness after drying was set to 50 µm. The applied solution was dried at 80° C. for an hour and heated at 100° C. for 10 minutes so that a crosslinking reaction was carried out, thereby forming a film comprising a polyvinyl acetal resin composition. The obtained film was sectioned with an ultramicrotome and the resulting sample was observed with a transmission electron microscope. Then, a structure was observed, in which the (meth)acrylic resin having a crosslinked structure was dispersed as a dispersed phase in the polyvinyl acetal resin as a continuous phase. The average dispersion size of the dispersed phase was measured. Table 1 shows the result.

(Measurement of Dynamic Viscoelasticity)

The dynamic viscoelasticity was measured in the same manner as in Example 1.

(Measurement of Gel Fraction of Resin Component Having Crosslinked Structure)

The gel fraction of the resin component having a crosslinked structure was measured in the same manner as in Example 1.

(Measurement of Grafting Ratio)

The grafting ratio was measured in the same manner as in Example 1.

<Evaluation>

The films obtained in the examples and comparative examples were evaluated as described in the following. Table 1 shows the results.

(Tensile Storage Elastic Modulus)

Based on the graph showing temperature dependence of the tensile storage elastic modulus and loss tangent obtained in the measurement of the dynamic elastic modulus, the change of the tensile storage elastic modulus due to the temperature is checked in a temperature range from a temperature (A) at which the loss tangent derived from the polyvinyl acetal resin reached the maximum value to a temperature (B) at which the loss tangent derived from the resin having a crosslinked structure reached the maximum value. The tensile storage elastic modulus was evaluated based on the following criteria.

○ (Excellent): A range where the tensile storage elastic modulus was $1\times10^7$ to $3\times10^9$ Pa·s covers at least 80% of the temperature range from the (A) to (B).
Δ (Average): A range where the tensile storage elastic modulus was $1\times10^7$ to $3\times10^9$ Pa·s covers less than 80% of the temperature range from the (A) to (B).
x (Poor): A range where the tensile storage elastic modulus was $1\times10^7$ to $3\times10^9$ Pa·s was not found in the temperature range from the (A) to (B).

(Strength)

The film was peeled from the release film and cut into a test sample in a size of 5 cm×1 cm. The test sample was subjected to measurement with a tensile tester (speed: 100 ram/min) for the tensile elongation and breaking strength. The measurement was performed at −20° C., 0° C., 20° C., 40° C., and 60° C. The tensile elongation and breaking strength were evaluated based on the following criteria.

[Tensile Elongation]
○ (Excellent): Tensile elongation of 150% or more.
Δ (Average): Tensile elongation of 100% or more but less than 150%.
x (Poor): Tensile elongation of less than 100%.

[Breaking Strength]
○ (Excellent): Breaking strength of 30 N/mm² or more.
Δ (Average): Breaking strength of 10 N/mm² or more but less than 30 N/mm².
x (Poor): Breaking strength of less than 10 N/mm².

Table 1 further shows the percentage of the tensile elongation at −20° C. relative to the tensile elongation at 60° C. and the percentage of the breaking strength at 60° C. relative to the breaking strength at −20° C.

TABLE 1

| | | | Example 1 | Example 2 | Example 3 | Example 4 | Example 5 | Example 5 | Example 7 | Example 8 |
|---|---|---|---|---|---|---|---|---|---|---|
| Formation of continuous phase and dispersion phase | | | Formed | Formed | Formed | Formed | Formed | Formed | Formed | Formed |
| Average dispersion size (μm) | | | 0.9 | 0.7 | 0.3 | 0.6 | 0.4 | 0.3 | 1 | 12 |
| Temperature at which loss tangent reached maximum value(° C.) | (A) derived from polyvinyl acetal resin | | 78 | 90 | 78 | 78 | 78 | 78 | 45 | 78 |
| | (B) derived from resin having crosslinked structure | | −32 | −17 | −31 | −5 | 4 | 7 | −32 | −35 |
| Evaluation of tensile storage elastic modulus | | | ○ | ○ | ○ | ○ | ○ | ○ | ○ | Δ |
| Gel fraction (% by weight) of resin (B) | | | 84 | 90 | 81 | 60 | 51 | 40 | 93 | 78 |
| Grafting ratio (% by weight) | | | 31 | 42 | 7 | 51 | 58 | 20 | 26 | 3 |
| Evaluation of strength | Tensile elongation | −20° C. | ○ | ○ | ○ | Δ | Δ | Δ | ○ | Δ |
| | | 0° C. | ○ | ○ | ○ | ○ | Δ | Δ | ○ | Δ |
| | | 20° C. | ○ | ○ | ○ | ○ | ○ | ○ | ○ | ○ |
| | | 40° C. | ○ | ○ | ○ | ○ | ○ | ○ | ○ | ○ |
| | | 60° C. | ○ | ○ | ○ | ○ | ○ | ○ | ○ | ○ |
| | Breaking strength | −20° C. | ○ | ○ | ○ | ○ | ○ | ○ | ○ | Δ |
| | | 0° C. | ○ | ○ | ○ | ○ | ○ | ○ | ○ | Δ |
| | | 20° C. | ○ | ○ | ○ | ○ | ○ | ○ | ○ | ○ |
| | | 40° C. | ○ | ○ | ○ | ○ | ○ | ○ | ○ | ○ |
| | | 60° C. | ○ | ○ | ○ | ○ | ○ | ○ | Δ | Δ |
| Tensile elongation at −20° C. relative to tensile elongation at 60° C. (%) | | | 92 | 89 | 80 | 72 | 65 | 56 | 90 | 48 |
| Breaking strength at 60° C. relative to breaking strength at −20° C. (%) | | | 87 | 91 | 82 | 80 | 73 | 63 | 57 | 49 |

| | | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| Formation of continuous phase and dispersion phase | | | Not formed | Not formed | Formed | Formed *1 | Formed | Formed | Formed |
| Average dispersion size (μm) | | | — | — | 0.7 | 3 | 1.5 | 2.5 | 1.5 |
| Temperature at which loss tangent reached maximum value(° C.) | (A) derived from polyvinyl acetal resin | | 78 | 78 | 78 | 78 | 78 | 78 | 34 |
| | (B) derived from resin having crosslinked structure | | — | −17 | 110 | −37 | −38(without crosslinked structure) | 16 | −32 |
| Evaluation of tensile storage elastic modulus | | | — | Δ | x | Δ | Δ | ○ | ○ |
| Gel fraction (% by weight) of resin (B) | | | — | 92 | 91 | 85 | 0 | 98 | 8 |
| Grafting ratio (% by weight) | | | — | 0 | 60 | 135 | 22 | 15 | 28 |
| Evaluation of strength | Tensile elongation | −20° C. | x | x | x | ○ | ○ | x | ○ |
| | | 0° C. | x | x | x | ○ | ○ | x | ○ |
| | | 20° C. | Δ | Δ | x | ○ | ○ | Δ | ○ |
| | | 40° C. | ○ | ○ | x | ○ | ○ | ○ | ○ |
| | | 60° C. | ○ | ○ | x | ○ | ○ | ○ | ○ |

TABLE 1-continued

| | | | | | | | | |
|---|---|---|---|---|---|---|---|---|
| Breaking strength | −20° C. | ○ | ○ | ○ | x | ○ | ○ | ○ |
| | 0° C. | ○ | ○ | ○ | x | ○ | ○ | ○ |
| | 20° C. | ○ | Δ | ○ | x | Δ | ○ | Δ |
| | 40° C. | ○ | Δ | ○ | x | Δ | ○ | x |
| | 60° C. | x | x | ○ | x | x | ○ | x |
| Tensile elongation at −20° C. relative to tensile elongation at 60° C. (%) | | 9 | 7 | 30 | 72 | 88 | 10 | 82 |
| Breaking strength at 60° C. relative to breaking strength at −20° C. (%) | | 7 | 4 | 40 | 3 | 22 | 55 | 25 |

*1 Compoent for continuous phase and component for dispersion phase were switched with each other

INDUSTRIAL APPLICABILITY

The present invention provides a polyvinyl acetal resin composition that exerts excellent mechanical strength over a wide temperature range from low temperatures to high temperatures.

The invention claimed is:

1. A polyvinyl acetal resin composition containing a polyvinyl acetal resin and a resin having a crosslinked structure,
    the polyvinyl acetal resin composition having a structure in which the resin having a crosslinked structure is dispersed as a dispersed phase in the polyvinyl acetal resin as a continuous phase,
    the polyvinyl acetal resin composition having a maximum value of a loss tangent derived from the polyvinyl acetal resin at 40° C. or higher and a maximum value of a loss tangent derived from the resin having a crosslinked structure at 10° C. or lower in measurement of a dynamic viscoelasticity spectrum at a frequency of 10 Hz, and
    the polyvinyl acetal resin composition comprising a graft copolymer of the polyvinyl acetal resin and the resin having a crosslinked structure, wherein the graft copolymer has a grafting ratio of 2 to 150% by weight.

2. The polyvinyl acetal resin composition according to claim 1,
    wherein, in measurement of the dynamic viscoelasticity spectrum at a frequency of 10 Hz, a tensile storage elastic modulus is $1 \times 10^7$ to $3 \times 10^9$ Pa·s in a range covering 80% or more of a temperature range from a temperature at which the loss tangent derived from the polyvinyl acetal resin reaches the maximum value to a temperature at which the loss tangent derived from the resin having a crosslinked structure reaches the maximum value.

3. The polyvinyl acetal resin composition according to claim 1,
    wherein the amount of the polyvinyl acetal resin is 30 to 95% by weight and the amount of the resin having a crosslinked structure is 5 to 70% by weight in 100% by weight of the total of the polyvinyl acetal resin and the resin having a crosslinked structure.

4. The polyvinyl acetal resin composition according to claim 1,
    wherein the dispersed phase comprising the resin having a crosslinked structure has an average dispersion size of 0.1 to 10 µm.

5. The polyvinyl acetal resin composition according to claim 1,
    wherein the resin having a crosslinked structure has a gel fraction of 10 to 98% by weight.

6. The polyvinyl acetal resin composition according to claim 1, being free of a plasticizer.

7. The polyvinyl acetal resin composition according to claim 1,
    wherein the resin having a crosslinked structure is a (meth)acrylic resin having a crosslinked structure.

8. The polyvinyl acetal resin composition according to claim 7, obtained by polymerization of a monomer constituting the (meth)acrylic resin in the presence of the polyvinyl acetal resin.

* * * * *